A. B. FERGUSON.
VEHICLE SPRING SUSPENSION MECHANISM.
APPLICATION FILED AUG. 27, 1912.
1,070,675.
Patented Aug. 19, 1913.
2 SHEETS—SHEET 1.
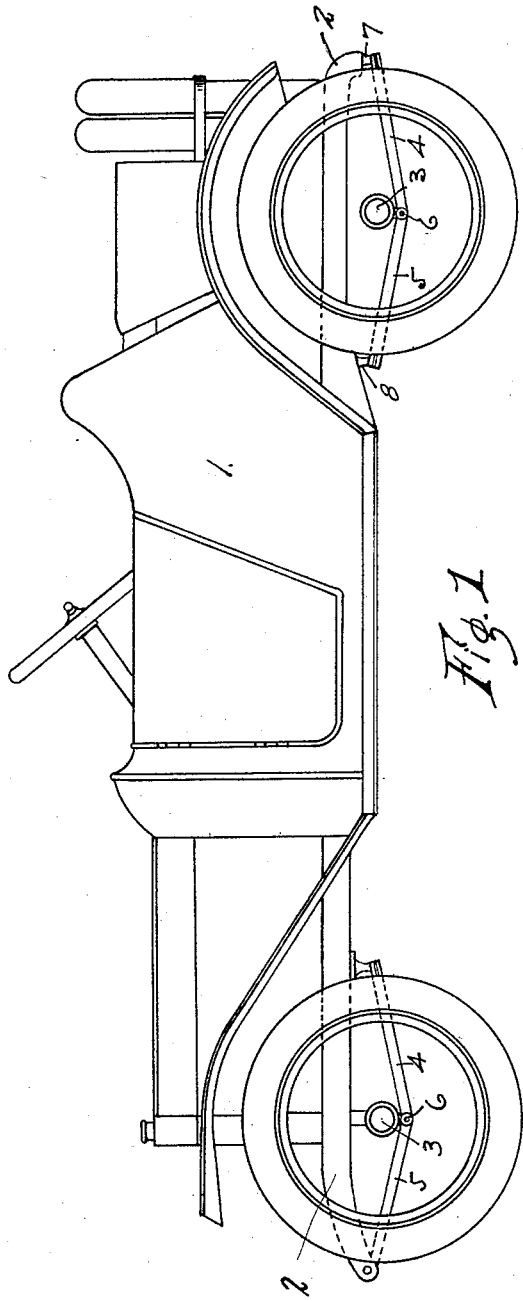
WITNESSES:
Harold C. Scantlebury
Nettie King
INVENTOR
Archibald Bruce Ferguson
BY Herbert E. Smith
his ATTORNEY

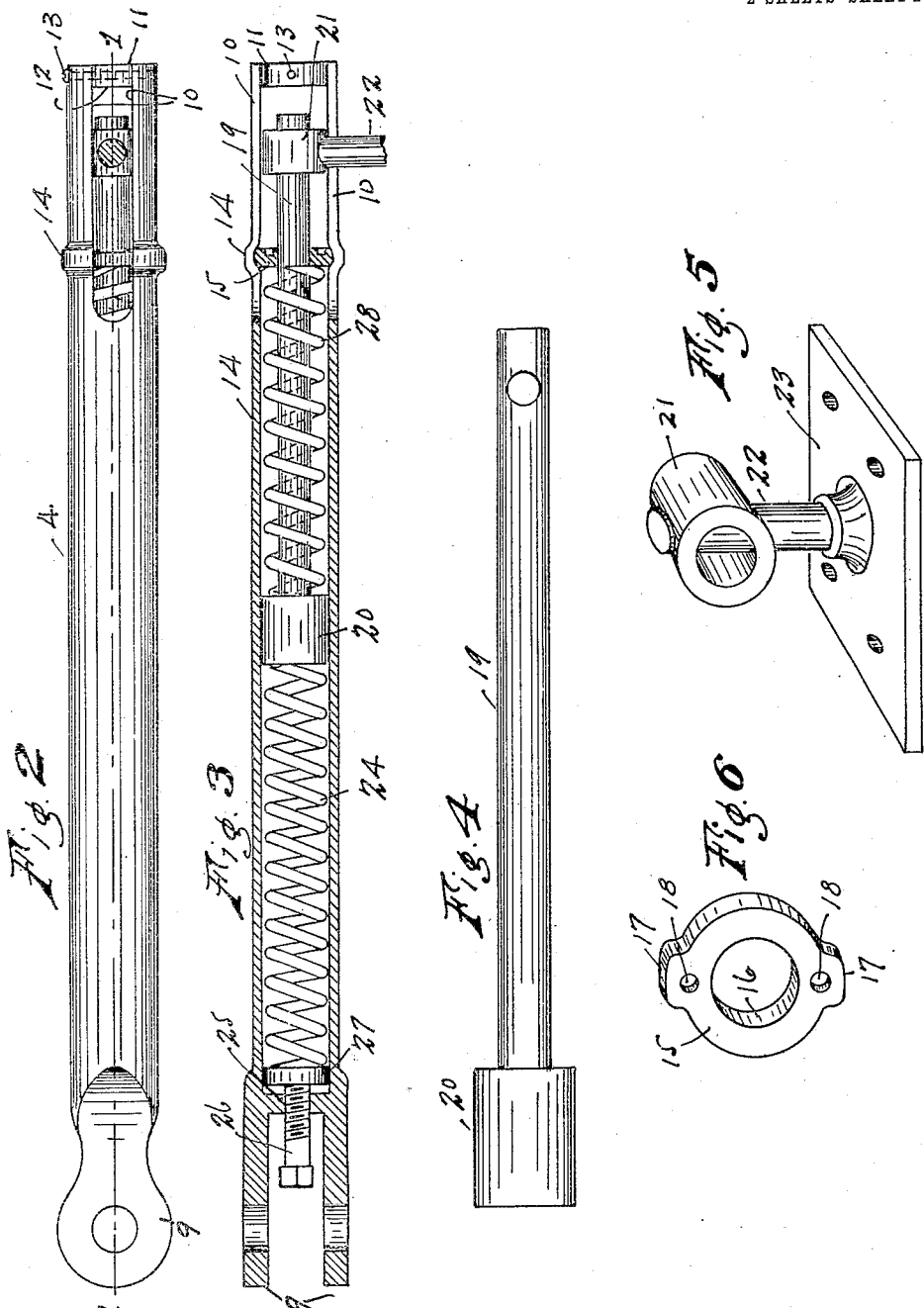

UNITED STATES PATENT OFFICE.

ARCHIBALD BRUCE FERGUSON, OF SPOKANE, WASHINGTON.

VEHICLE SPRING-SUSPENSION MECHANISM.

1,070,675.   Specification of Letters Patent.   Patented Aug. 19, 1913.

Application filed August 27, 1912.   Serial No. 717,267.

*To all whom it may concern:*

Be it known that I, ARCHIBALD BRUCE FERGUSON, a citizen of the United States, residing at 507 Bridgeport avenue east, Spokane, in the county of Spokane, State of Washington, have invented certain new and useful Improvements in Vehicle Spring-Suspension Mechanism, of which the following is a specification.

My invention relates to improvements in spring suspension devices for vehicles and one of the objects of my invention is to avoid the use of leaf springs and to provide a coil spring suspension which may not only be readily attached and detached, but may also be adjusted to vary the action of the springs, and further; to render the action of the springs uniform, one with respect to the other, to overcome wear and to provide for inequality of any character.

In accordance with my invention coil springs are employed and provision is made for overcoming bounding action of the vehicle body when the vehicle is running over rough or uneven surface.

My invention will be more fully described in connection with the accompanying drawings and will be more particularly pointed out in and by the appended claims.

Figure 1, is a view of side elevation showing the application of my invention to an automobile. Fig. 2, is a side elevation of one spring casing with a portion thereof in section. Fig. 3, is a sectional view of the casing shown in Fig. 2 on line 1—1 of Fig. 2. Fig. 4, is a detail view in elevation of a spring follower. Fig. 5, is a perspective view of a mounting for rigidly connecting the follower to the frame of the vehicle body. Fig. 6, is a perspective view of a spring retaining member.

Like numerals of reference designate similar parts throughout the different figures of the drawings.

As illustrated, 1 designates the body of an automobile having body supporting frame members 2, connected with the axle 3, by my improved spring suspension mechanism.

In the form shown, my invention comprises a pair of spring holders or casings 4 and 5 which are shown pivotally connected with the axle 3 at 6. Rigid connections with the body frame members 2 are provided at 7 and 8. The casing 4 is bifurcated to provide pivot lugs 9 adapted for connection at the axle at 6. The casing 4 is hollow and is provided with slots 10 and the open end is closed by a disk 11, having lugs 12, projecting into the slotted portions 10. The disk 11 may be secured to the slotted end of the casing 4 by a pin or screw 13.

Inwardly, with respect to the slotted end 10, the casing 4 is provided with an annular enlargement 14 to receive an element 15, adapted to act as a spring retainer and bearing member. The spring retainer 15 is provided with a bore 16 and lugs 17 adapted to register with the slotted portions when the member 15 is inserted in position. Spanner openings 18, may be provided for imparting a slight turn to the member 15 when the same reached the enlargement 14, so as to project the lugs 17 into the enlargement with the annular enlargement 14 to lock the member 15 into position.

A follower is mounted in the casing 4 and the same may comprise a shank 19 and an enlarged head 20. The head is proportioned to fit the casing 4 with a snug working fit and the shank 19 projects through and has a bearing in the bore 16 of the retainer 15. The end of the shank 19 projects beyond the retainer and may be provided with a collar 21, through which and the shank 19, a stud 22 projects. The stud 22 is provided with a suitable base or mounting 23 adapted to be secured to one of the frame members 2, one at point 7 or 8.

An expansively acting main spring, preferably of the coiled type, as indicated at 24, is disposed inwardly of the casing between the head 20, of the follower, and the rear or inner wall 25 of the casing 4. The spring 24 tends to force the follower outwardly, as regards the pivot 6, and the rigid connection of the followers of the casings, with the frame members 2, results in a disposition of the casing 4 in oppositely and upwardly inclined positions shown in Fig. 1. The load carried by the spring suspension device tends to lower the casing 4 into a horizontal position but the action of the springs 24 opposes this tendency and maintain the casings 4 in the inclined position shown, yieldingly in accordance with the various loads imposed.

In order that all of the springs 24 may act uniformly and for the purpose of taking up wear and the loss of tension, adjusting means may be provided for the springs 24 and may consist of an adjusting screw 26, extending through the wall 25, and provided with a spring abutment 27. By adjusting the screw 26 the tension of the spring 24 may be increased or decreased, as desired.

A recoil spring 28, of the coil type, is interposed between the retainer 15 and the head 20 of the follower and in the position shown in Fig. 3, which is the normal position, the recoil spring 28 is preferably not under tension. When the vehicle is running over rough surfaces and the body is caused to bound upwardly the outward movement of the follower head 20 placed the recoil spring 28 under tension to resist the upward movement of the body yieldingly.

While I have described but one form of my invention it is understood that I do not wish to be limited thereto except as such limitations as the claims may import.

I claim:—

1. In a vehicle spring suspension mechanism the combination with an axle, frame portions disposed on opposite sides of the axle, spring inclosing casings pivoted to the axle and extending in opposite directions therefrom, spring followers slidable in these casings and rigidly connected with the frame portions and expansively acting coil springs in said casings, forcing the followers thereof in directions toward their rigid connections, substantially described.

2. In a vehicle spring suspension mechanism, the combination with an axle, frame portions disposed on opposite sides of the axle, spring inclosing casings pivoted to the axle and extending in opposite directions therefrom, spring followers slidable in said casings and connected with the frame portions, and expansively acting coil springs in each casing forcing the followers in directions toward their connections, substantially described.

3. In a vehicle spring suspension mechanism, the combination with an axle, frame portions disposed on the opposite sides of the axle, spring inclosing casings pivoted to the axle and extending in opposite directions therefrom, spring followers slidable in each casing and rigidly connected with one of said frame portions and expansively acting springs in said casings forcing the followers in toward their connections with said frame portions, and recoil springs in said casings resisting such movement of the followers thereof, substantially described.

4. In a vehicle spring suspension mechanism, the combination with an axle, frame portions disposed on opposite sides of the axle, spring casings pivoted to the axle and extending in opposite directions therefrom and provided with inner adjustable spring abutments, recoil spring retainer and bearing members removably mounted in said casings, followers in said casings having relatively reduced shanks slidable in said retainers and relatively enlarged heads slidable in casings, expansively acting coil suspension springs disposed between the abutments and the follower heads, recoil springs between the follower heads and said retainers, and devices rigidly connecting the followers with said frame portions.

In testimony whereof I affix my signature in presence of two witnesses.

ARCHIBALD BRUCE FERGUSON.

Witnesses:
HAROLD E. SCANTLEBURY,
NETTIE KING.

Copies of this patent may be obtained for five cents each, by addressing the "Commissioner of Patents, Washington, D. C."